United States Patent
Weissman et al.

(10) Patent No.: US 8,131,713 B2
(45) Date of Patent: *Mar. 6, 2012

(54) DISTRIBUTIVE STORAGE TECHNIQUES FOR MULTI-TENANT DATABASES

(75) Inventors: Craig Weissman, San Francisco, CA (US); Dave Moellenhoff, Orinda, CA (US); Simon Wong, Redwood City, CA (US); Paul Nakada, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,866

(22) Filed: Apr. 14, 2010

(65) Prior Publication Data

US 2010/0211619 A1 Aug. 19, 2010

Related U.S. Application Data

(63) Continuation of application No. 11/558,761, filed on Nov. 10, 2006, which is a continuation-in-part of application No. 10/669,523, filed on Sep. 3, 2003, now Pat. No. 7,529,728, and a continuation-in-part of application No. 12/420,693, filed on Apr. 8, 2009.

(51) Int. Cl.
*G06F 17/30* (2006.01)
(52) U.S. Cl. .................. 707/718; 707/770; 707/781
(58) Field of Classification Search .............. 707/770, 707/781–784, 713, 718

See application file for complete search history.

(56) References Cited

U.S. PATENT DOCUMENTS

| | | | |
|---|---|---|---|
| 5,072,370 A | 12/1991 | Durdik | |
| 5,787,437 A | 7/1998 | Potterveld et al. | |
| 5,794,232 A | 8/1998 | Mahlum et al. | |
| 5,941,947 A | 8/1999 | Brown et al. | |
| 5,950,190 A | 9/1999 | Yeager et al. | |
| 5,974,409 A | 10/1999 | Sanu et al. | |
| 5,987,471 A | 11/1999 | Bodine et al. | |
| 6,064,656 A | 5/2000 | Angal et al. | |

(Continued)

OTHER PUBLICATIONS

[online]; [published on Oct. 17, 2008]; [retrieved on Feb. 26, 2010]; retrieved from http://en.wikipedia.org/wiki/Push_technology.
[online]; [published on Oct. 16, 2008]; [retrieved on Feb. 26, 2010]; retrieved from http://en.wikipedia.org/wiki/Customer_Relationship_Management.
[online]; [published on Apr. 22, 2008]; [retrieved on Feb. 26, 2010]; retrieved from http://en.wikipedia.org/wiki/Flat_file_database.
[online]; [published on Apr. 25, 2008]; [retrieved on Feb. 26, 2010]; retrieved from http://en.wikipedia.org/wiki/Relational_database.

(Continued)

*Primary Examiner* — Khanh Pham
(74) *Attorney, Agent, or Firm* — Weaver Austin Villeneuve & Sampson LLP

(57) ABSTRACT

The present invention provides techniques for managing information on a multi-tenant database system. In one embodiment a method comprises storing the information on the database among a plurality of tables. The plurality of tables is arranged in columns and rows. Each of a subset of the plurality of tables has sets of the rows distributed amongst different storage nodes on the database. A first of the sets is located at a first node, and a second of the sets is located a second node. Data storage and retrieval capabilities are provided to the database, including access to the information, in response to requests from one of a plurality of remotely disposed computer systems. Also disclosed is a machine-readable medium carrying one or more sequences of instructions for managing computer applications when executed by one or more processors and cause the one or more processors to carry out steps of the method. A data center for managing information on a multi-tenant database is also disclosed that carries-out the functions of the method.

20 Claims, 3 Drawing Sheets

U.S. PATENT DOCUMENTS

| | | | |
|---|---|---|---|
| 6,085,191 | A | 7/2000 | Fisher et al. |
| 6,112,198 | A | 8/2000 | Lohman et al. |
| 6,189,000 | B1 | 2/2001 | Gwertzman et al. |
| 6,219,667 | B1 | 4/2001 | Lu et al. |
| 6,226,641 | B1 | 5/2001 | Hickson et al. |
| 6,233,618 | B1 | 5/2001 | Shannon |
| 6,330,560 | B1 | 12/2001 | Harrison et al. |
| 6,341,288 | B1 | 1/2002 | Yach et al. |
| 6,345,288 | B1 | 2/2002 | Reed et al. |
| 6,438,562 | B1 * | 8/2002 | Gupta et al. .............. 707/696 |
| 6,446,109 | B2 | 9/2002 | Gupta |
| 6,453,038 | B1 | 9/2002 | McFarlane et al. |
| 6,578,037 | B1 | 6/2003 | Wong et al. |
| 6,609,148 | B1 | 8/2003 | Salo et al. |
| 6,658,417 | B1 | 12/2003 | Statukis et al. |
| 6,721,765 | B2 | 4/2004 | Ghosh et al. |
| 6,732,100 | B1 * | 5/2004 | Brodersen et al. ..... 707/999.002 |
| 6,839,608 | B2 | 1/2005 | Liu et al. |
| 6,944,133 | B2 | 9/2005 | Wisner et al. |
| 6,947,927 | B2 | 9/2005 | Chaudhuri et al. |
| 7,076,633 | B2 | 7/2006 | Tormasov et al. |
| 7,152,109 | B2 | 12/2006 | Suorsa et al. |
| 7,174,483 | B2 | 2/2007 | Worrall et al. |
| 7,185,192 | B1 | 2/2007 | Kahn |
| 7,206,805 | B1 | 4/2007 | McLaughlin, Jr. |
| 7,206,807 | B2 | 4/2007 | Cheenath |
| 7,209,929 | B2 | 4/2007 | Dominguez, Jr. et al. |
| 7,249,118 | B2 | 7/2007 | Sandler et al. |
| 7,305,577 | B2 | 12/2007 | Zhang |
| 7,308,704 | B2 | 12/2007 | Vogel et al. |
| 7,350,237 | B2 | 3/2008 | Vogel et al. |
| 7,373,364 | B1 | 5/2008 | Chapman |
| 7,448,079 | B2 | 11/2008 | Tremain |
| 7,484,219 | B2 | 1/2009 | Mitra |
| 7,529,728 | B2 | 5/2009 | Weissman et al. |
| 7,577,092 | B2 | 8/2009 | San Andres et al. |
| 7,580,975 | B2 | 8/2009 | Cheenath |
| 7,599,953 | B2 | 10/2009 | Galindo-Legaria et al. |
| 7,661,027 | B2 | 2/2010 | Langen et al. |
| 7,693,820 | B2 | 4/2010 | Larson et al. |
| 7,734,608 | B2 | 6/2010 | Fell et al. |
| 7,769,825 | B2 | 8/2010 | Karakashian et al. |
| 7,774,366 | B2 | 8/2010 | Fisher et al. |
| 7,779,039 | B2 | 8/2010 | Weissman et al. |
| 7,814,052 | B2 | 10/2010 | Bezar et al. |
| 7,814,470 | B2 | 10/2010 | Mamou et al. |
| 7,827,138 | B2 | 11/2010 | Salmon et al. |
| 7,849,401 | B2 | 12/2010 | Elsa et al. |
| 2001/0023440 | A1 | 9/2001 | Franklin et al. |
| 2002/0133392 | A1 | 9/2002 | Angel et al. |
| 2004/0015578 | A1 | 1/2004 | Karakashian et al. |
| 2004/0044656 | A1 | 3/2004 | Cheenath |
| 2004/0045004 | A1 | 3/2004 | Cheenath |
| 2004/0111410 | A1 | 6/2004 | Burgoon et al. |
| 2004/0059420 | A1 | 7/2004 | Kumar et al. |
| 2004/0220952 | A1 | 11/2004 | Cheenath |
| 2005/0283478 | A1 | 12/2005 | Choi et al. |
| 2006/0095960 | A1 | 5/2006 | Arregoces et al. |
| 2006/0100912 | A1 | 5/2006 | Kumar et al. |
| 2006/0136382 | A1 | 6/2006 | Dettinger et al. |
| 2007/0078705 | A1 | 4/2007 | Abels et al. |
| 2007/0088741 | A1 | 4/2007 | Brooks et al. |
| 2007/0124276 | A1 | 5/2007 | Weissman et al. |
| 2007/0130130 | A1 | 6/2007 | Chan et al. |
| 2007/0130137 | A1 | 6/2007 | Oliver et al. |
| 2007/0150546 | A1 | 6/2007 | Karakashian et al. |
| 2007/0226640 | A1 | 9/2007 | Holbrook et al. |
| 2008/0010243 | A1 | 1/2008 | Weissman et al. |
| 2008/0082540 | A1 | 4/2008 | Weissman et al. |
| 2008/0082572 | A1 | 4/2008 | Ballard et al. |
| 2008/0082986 | A1 | 4/2008 | Cheenath et al. |
| 2008/0086358 | A1 | 4/2008 | Doshi et al. |
| 2008/0086447 | A1 | 4/2008 | Weissman et al. |
| 2008/0086479 | A1 | 4/2008 | Fry et al. |
| 2008/0086482 | A1 | 4/2008 | Weissman |
| 2008/0086514 | A1 | 4/2008 | Weissman et al. |
| 2008/0086567 | A1 | 4/2008 | Langen et al. |
| 2008/0086735 | A1 | 4/2008 | Cheenath et al. |
| 2008/0162544 | A1 | 7/2008 | Weissman et al. |
| 2008/0201701 | A1 | 8/2008 | Hofhansel et al. |
| 2008/0215560 | A1 | 9/2008 | Bell et al. |
| 2008/0270354 | A1 | 10/2008 | Weissman et al. |
| 2008/0270987 | A1 | 10/2008 | Weissman et al. |
| 2009/0030906 | A1 | 1/2009 | Doshi et al. |
| 2009/0049065 | A1 | 2/2009 | Weissman et al. |
| 2009/0049101 | A1 | 2/2009 | Weissman et al. |
| 2009/0049102 | A1 | 2/2009 | Weissman et al. |
| 2009/0049288 | A1 | 2/2009 | Weissman et al. |
| 2009/0276395 | A1 | 11/2009 | Weissman et al. |
| 2009/0276405 | A1 | 11/2009 | Weissman et al. |
| 2009/0282045 | A1 | 11/2009 | Hsieh et al. |
| 2009/0319529 | A1 | 12/2009 | Bartlett et al. |
| 2010/0191719 | A1 | 7/2010 | Weissman et al. |
| 2010/0205216 | A1 | 8/2010 | Durdik |
| 2010/0223284 | A1 | 9/2010 | Brooks et al. |
| 2010/0235837 | A1 | 9/2010 | Weissman et al. |
| 2010/0274779 | A1 | 10/2010 | Weissman et al. |

OTHER PUBLICATIONS

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Varadharajan, Arunkumaran, U.S. Appl. No. 12/909,820, filed Oct. 21, 2010.

First named inventor: Pin, Oliver, U.S. Appl. No. 12/895,833, filed Sep. 30, 2010.

First named inventor: Press, William A., U.S. Appl. No. 12/850,502, filed Aug. 4, 2010.

First named inventor: Tanaka, Jay, U.S. Appl. No. 12/831,209, filed Jul. 6, 2010.

First named inventor: Tanaka, Jay, U.S. Appl. No. 12/831,196, filed Jul. 6, 2010.

First named inventor: Williams, Alexis, U.S. Appl. No. 13/028,236, filed Feb. 16, 2011.

\* cited by examiner

DISTRIBUTIVE STORAGE TECHNIQUES FOR MULTI-TENANT DATABASES

CROSS-REFERENCES TO RELATED APPLICATIONS

This application is a continuation application of U.S. patent application Ser. No. 11/558,761, filed Nov. 10, 2006, entitled SYSTEM AND METHODS OF IMPROVING A MULTI-TENANT DATABASE QUERY USING CONTEXTUAL KNOWLEDGE ABOUT NON-HOMOGENEOUSLY DISTRIBUTED TENANT DATA with Craig Weissman, Dave Moellenhoff, and Simon Wong listed as inventors, which is a continuation in part of U.S. patent application Ser. No. 10/669,523, filed Sep. 3, 2003, now U.S. Pat. No. 7,529,728 entitled QUERY OPTIMIZATION IN A MULTI-TENANT DATABASE SYSTEM with Craig Weissman, Dave Moellenhoff, Simon Wong and Paul Nakada listed as inventors. The present application is also a continuation-in-part of application of U.S. patent application Ser. No. 12/420,693, filed Apr. 8, 2009, entitled QUERY OPTIMIZATION IN A MULTI-TENANT DATABASE SYSTEM, with Craig Weissman, Dave Moellenhoff, Simon Wong and Paul Nakada listed as inventors, which is a continuation of United States patent application Ser. No. 10/669,523, filed Sep. 3, 2003, entitled QUERY OPTIMIZATION IN A MULTI-TENANT DATABASE SYSTEM with Craig Weissman, Dave Moellenhoff, Simon Wong and Paul Nakada listed as inventors. The disclosure of the aforementioned patent applications is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to database systems and more particularly to query optimization systems and methods for use in multi-tenant database systems, wherein a centralized computer or set of computing devices serve and store applications and data for use by multiple tenants.

Multi-tenant database systems allow for users to access applications and/or data from a network source that, to the user, appears to be centralized (but might be distributed for backup, redundancy and/or performance reasons). An example of a multi-tenant system is a computing system that is accessible to multiple independent parties to provide those parties with application execution and/or data storage. Where there is an appearance of centralization, and network access, each subscribing party (e.g., a "tenant") can access the system to perform application functions, including manipulating that tenant's data.

With a multi-tenant system, the tenants have the advantage that they need not install software, maintain backups, move data to laptops to provide portability, etc. Rather, each tenant user need only be able to access the multi-tenant system to operate the applications and access that tenant's data. One such system usable for customer relationship management is the multi-tenant system accessible to salesforce.com subscribers. With such systems, a user need only have access to a user system with network connectivity, such as a desktop computer with Internet access and a browser or other HTTP client, or other suitable Internet client.

In database systems, to access, retrieve and process stored data, a query is generated, automatically or manually, in accordance with the application program interface protocol for the database. In the case of a relational database, the standard protocol is the structured query language (SQL). SQL statements are used both for interactive queries for data from the database and for gathering data and statistics. The efficiency of the query method underlying the actual query is dependent in part on the size and complexity of the data structure scheme of the database and in part on the query logic used.

Previous database query methods have been inefficient for multi-tenant databases because such methods do not understand, and fail to account for, the unique characteristics of each tenant's data. For example, while one tenant's data may include numerous short records having only one or two indexable fields, another tenant's data may include fewer, longer records having numerous indexable fields.

In addition to these structural (schema) differences, the distribution of data among different tenants may be quite different, even when their schemas are similar. Modern relational databases rely on statistics-based query optimizers that make decisions about the best manner to answer a query given accurate table-level and column-level statistics that are gathered periodically. Importantly, however, because existing relational databases are not multi-tenant aware, these statistics cut across all tenants in the database. That is, the statistics that are gathered are not specific to any one tenant, but are in fact an aggregate or average of all tenants. This approach can lead to incorrect assumptions and query plans about any one tenant.

As a specific example, Oracle provides a query optimizer that can be used on an Oracle database. This query optimizer works generally as follows: for each table, column, or index, aggregate statistics are gathered (typically periodically or on demand by a database administrator ("DBA")). The gathered statistics typically include the total number of rows, average size of rows, total number of distinct values in a column or index (an index can span multiple columns), histograms of column values (which place a range of values into buckets), etc. The optimizer then uses these statistics to decide among a possible set of data access paths.

In general, one goal of a query optimizer is to minimize the amount of data that must be read from disk (e.g., because disk access may be a slow operation). The optimizer therefore typically chooses tables or columns that are most "selective"—that is, will yield the fewest rows when the query condition is evaluated. For instance, if a single query filters on two columns of a single table, and both columns are indexed, then the optimizer will use the index that has the highest number of distinct values because statistically for any given filter value a smaller number of rows are expected to be returned. If the optimizer knows that a certain column has a very high cardinality (number of distinct values) then the optimizer will choose to use an index on that column versus a similar index on a lower cardinality column. The optimizer assumes relatively even distribution of data and therefore reaches the conclusion that the high-cardinality column is likely to yield a smaller number of satisfying-rows for a given equality filter.

Now consider in a multi-tenant system a physical column (shared by many tenants) that has a large number of distinct values for most tenants, but a small number of distinct values for a specific tenant. For this latter tenant the query optimizer will use this overall-high-cardinality column in error—because the optimizer is unaware that for this specific tenant the column is not selective.

In the case of table joins, the optimizer's decisions may be even more important—deciding which table to retrieve first can have a profound impact on overall query performance. Here again, by using system-wide aggregate statistics the optimizer might choose a query plan that is incorrect or inefficient for a single tenant that does not conform to the "normal" average of the entire database as determined from the gathered statistics.

Accordingly, it is desirable to provide systems and methods for optimizing database queries, and for dynamically tuning a query optimizer, in a multi-tenant database system which overcome the above and other problems.

BRIEF SUMMARY

The present invention provides techniques for managing information on a multi-tenant database system. In one embodiment a method comprises storing the information on the database among a plurality of tables. The plurality of tables is arranged in columns and rows. Each of a subset of the plurality of tables has sets of the rows distributed amongst different storage nodes on the database. A first of the sets is located at a first node, and a second of the sets is located a second node. Data storage and retrieval capabilities are provided to the database, including access to the information, in response to requests from one of a plurality of remotely disposed computer systems. Also disclosed is a machine-readable medium carrying one or more sequences of instructions for managing computer applications when executed by one or more processors and cause the one or more processors to carry out steps of the method. A data center for managing information on a multi-tenant database is also disclosed that carries-out the functions of the method. These and other embodiments are described more fully below.

DETAILED DESCRIPTION

Figure 1:
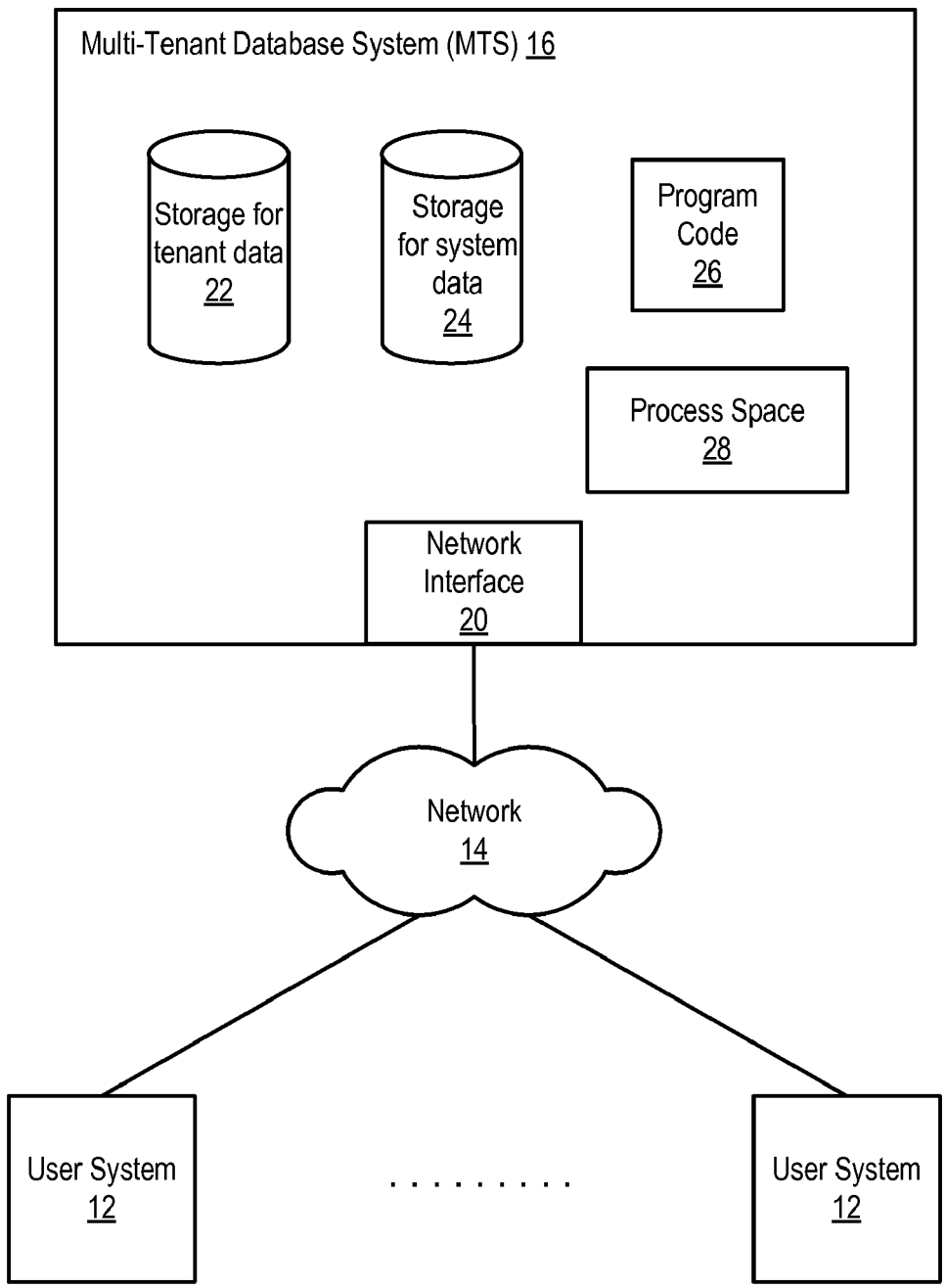
FIG. 1 illustrates an environment wherein a multi-tenant database system (MTS) might be used according to one embodiment.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, it has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing a server.

in preferred aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that that one tenant does not have access to another tenant's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTS's could include one or more logically and/or physically connected servers distributed locally or across one or more geographic locations. Additionally, the term "server" is meant to include a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
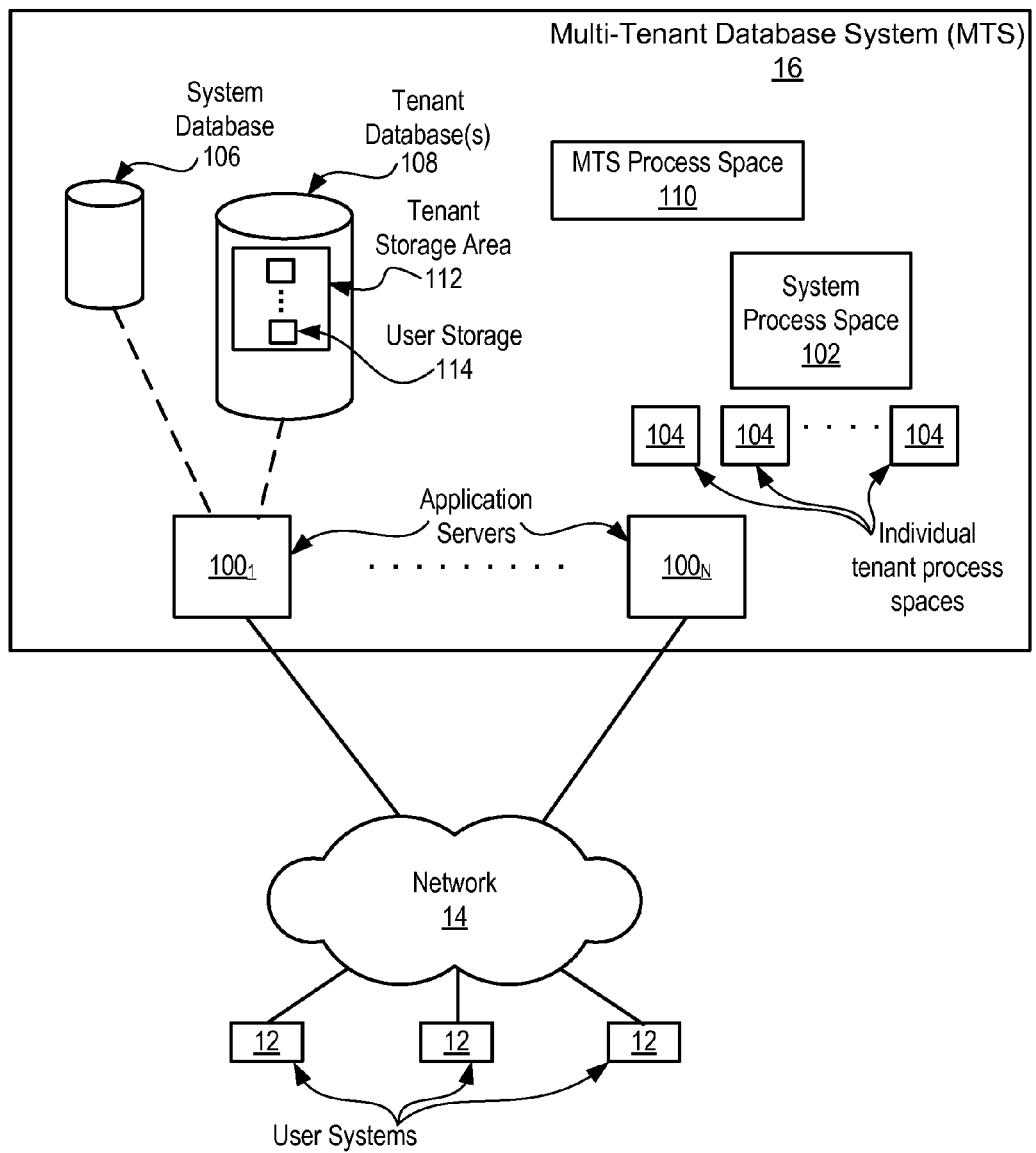
FIG. 2 illustrates elements of an MTS and interconnections therein in more detail according to one embodiment.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality or all of the sales force for a given organization that is a tenant. Thus, there might be some data structures managed by MTS 16 that are allocated at the tenant level while other data structures are managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 generates automatically one or more SQL statements (the SQL query) designed to access the desired information.

Each database can generally be viewed as a set of logical tables containing data fitted into predefined categories. Each table generally contains one or more data categories logically arranged in physical columns. Each row of a table contains an instance of data for each category defined by the columns. For example, a CRM database may include a table that describes a customer with columns for basic contact information such as name, address, phone number, fax number, etc. Another table might describe a purchase order, including columns for information such as customer, product, sale price, date, etc.

Now, consider in a multi-tenant system a physical column (shared by many tenants) that has a large number of distinct values for most tenants, but a small number of distinct values for a specific tenant. For this latter tenant, a typical database optimizer will choose to use this overall-high-cardinality column in error because the optimizer is unaware that for this specific tenant the column is not selective.

In the case of table joins the optimizer's decisions may be even more important—deciding which table to retrieve first can have a profound impact on overall query performance. Here again, by using system-wide aggregate statistics the optimizer might choose a query plan that is incorrect or inefficient for a single tenant that does not conform to the "normal" average of the entire database.

As a specific example of the importance of table joins, consider the sharing feature in the salesforce.com service. The sharing feature allows a specific list of users to have access to privileged data, such as specific accounts or opportunities. In one aspect, a Many-to-Many (MTM) physical table serves as the storage for this sharing information. The MTM table specifies that a user has access to a particular entity (e.g., account or opportunity) row. When displaying a list of all rows that the current user can see (possibly with a filter on the entity rows, such as the name of the account or the dollar amount of the opportunity) the query optimizer must choose between accessing this MTM table from the user or the entity side of the relationship. If the entity filter is highly selective (for instance, a particular account name such as "XYZ Corp") it will generally make more sense to begin the query access path from this side. If, however, the entity is not filtered selectively, but the current user has access to a small amount of data, then the query optimizer should access rows in the MTM table through the user side of this relationship.

However, in the above example in a multi-tenant database system the optimizer's native statistics may be insufficient to make this determination because the native statistics will aggregate across too many tenants and will not have context into the current tenant's data.

Note, because of the wide range of business types, industries, and sizes potentially served by multi-tenant database systems such as the salesforce.com service, the likelihood of data "skew" is greatly increased. That is, the statistical profile of the largest most complex tenants is likely to look very different from that of small or medium sized customers.

In Oracle database systems, override mechanisms are provided to affect the Oracle automatic query optimizer. The use of query "Hints" allows the SQL author the ability to choose explicitly a query plan. For instance, a human-authored SQL statement might mention the explicit order of table joins, or explicit index names to use (rather than letting the optimizer choose automatically). Another mechanism for controlling the query plan explicitly is to re-write the query using different SQL syntax. For instance, a single flat SQL statement can be re-written using a nested SELECT in the FROM clause of the outer query. Joins and semi-joins are sometimes interchangeable. Anti-joins can be written using the MINUS operator, etc. All of these are examples of ways in which a human-author, or a programmatic SQL generator, can alter the behavior of the underlying query optimizer by using higher-level knowledge to change the plan.

In certain aspects, the present invention configures or tunes a query optimizer, such as the Oracle query optimizer, by supplying appropriate "hints." For example, when SQL is generated programmatically by the MTS, the tenant-level statistics are consulted and a dynamic decision is made as to the syntax of the query. The tenant-level statistics preferably mirror the underlying relational database statistics in many ways (for example, in one aspect they track the total number of distinct values for indexed columns) but the statistics are kept on a per-tenant basis (e.g., in tables in tenant database storage areas 112). Similarly for important application functionality, such as the sharing feature, the MTS tracks the approximate number of rows to which each user has access and stores such statistics (e.g., tables stored in user storage areas 114 of database 108). Then, when a filtered sharing query arrives, the dynamically generated SQL includes the appropriate hints and structure to force a query plan that is optimal.

Optimizer

In one aspect, metadata information about users and tenants/organizations and the data contained in entity rows for that tenant are tracked (e.g., relevant information and metadata stored to separate user-level and tenant-level data tables) in order to make choices about query access paths, particularly for list-style queries such as reports. The areas targeted include:

1. The evaluation of a sharing model, which controls which users can see which records. The optimizer preferably distinguishes between users that can see many rows in an organization (e.g., bosses) versus users who can see very few rows (e.g., lower level employees).
2. The choice of which filters are the most selective for fields that contain enumerated lists of values (e.g., list of status values for an account, list of industries, list of states, etc.).

Sharing Model

For each user in the system an approximate count of the number of rows (for each entity type that has a sharing model) that the user can see is tracked. This number of rows (as a percentage of the total number of entity rows for that organization) is used as a decision point in choosing between two different query paths. It has been determined empirically that users who can see most of the entity rows (e.g., bosses) benefit from a certain query structure, whereas users who can see a small percentage of the entity rows (e.g., lower level employees) benefit from a different query structure. Current systems are not able to choose between these paths without having an entirely different SQL provided via a programmatic decision. In preferred aspects, an optimization engine reads data from multi-tenant data tables and stores metadata (e.g., number of rows accessible per tenant or per user, or other metadata) to tenant-level tables or user-level tables in database 108. For example, a tenant-level metadata table might be stored to a tenant storage area 112 and a user-level table might be stored to a user storage area 114. For example, in one aspect, the optimization engine includes a statistics generation engine that process multi-tenant tables and produces tenant-level and user-level statistics tables. The optimization engine and statistics generation engine might execute in process space 110 or other process space. The optimization engine retrieves and processes the appropriate tables when optimizing SQL queries. In other aspects, flags or tags are implemented in the multi-tenant database tables to distinguish users and tenants.

In order to keep the statistics up to date it is important to track the percentage of rows that each and every user can see. In one aspect, there are three ways in which a user might gain access to data in a private security model:

(1) Rows owned by the user or users below him in the role hierarchy;
(2) Rows that are shared via sharing rules to a group to which this user belongs; and
(3) Rows that are shared via manual/team sharing to this user (possibly via a group).

In a preferred aspect, statistics and metadata are tracked for user and organization quotas. In some aspects, such information is tracked periodically (e.g., on a scheduled basis—during off-peak hours, amortizing the work over multiple days), wherein the number of visible rows for each user is calculated exactly or approximately, or before every Nth query (e.g., every $10^{th}$ query) by a user, that user's visibility is calculated explicitly and then that statistic is used until it is again calculated (here it is assumed that users do not change very often from one strategy to another). In yet a further aspect, whenever an unconstrained query is run, the number of visible rows is remembered and that number is used until the user runs the next unconstrained query.

In one aspect, the total number of rows for each entity type for each organization is tracked (this is useful for any of the strategies above). Also, the total number of rows owned by each user in a metadata table is tracked.

If it is assumed that (1) and (2) are the most important reasons for why a user has access to entity records (this might be known empirically from how organizations use the system) then the information needed to calculate the number of rows a user can see, approximately, is known. Namely, the role hierarchy metadata tables can be used in conjunction with the metadata table to determine the number of records owned by the user or his subordinates. The sharing rule metadata can also be used along with the group definition metadata to calculate the total number of rows visible via sharing rules. While these two sets may overlap, for the purpose of the heuristic decision between "boss" and "lower level employee," the sum of these two values is sufficiently close to the true value.

In one aspect, the use of metadata tables only (which are generally much smaller than the actual entity tables which might have millions of rows) ensures that the calculation of visible rows will itself not require much time. In one aspect, this decision is cached in a user-information data structure kept by the running application servers 100, e.g., with a timeout value. In this manner, even though the calculation itself may be relatively lightweight, it is only performed periodically while a user is logged in.

Figure 3:
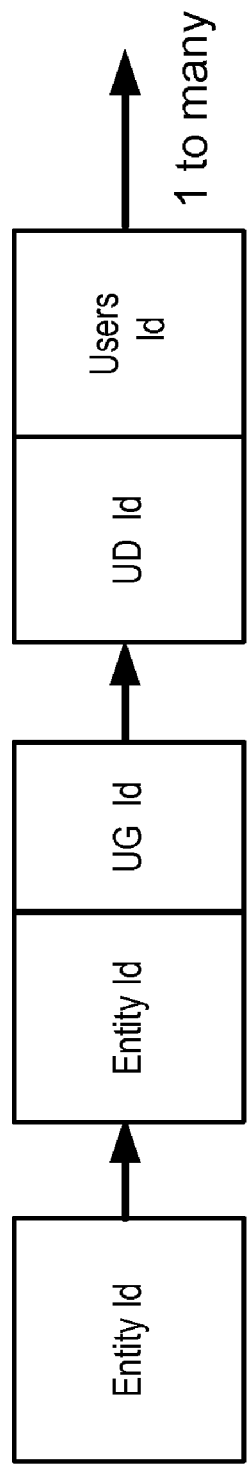
FIG. 3 illustrates an example of a data model for sharing.

To focus on how the "boss" vs "lower level employee" decision should drive an appropriate query plan, consider a query of the form: "Show me all accounts that I can see" in a private account sharing model. An example of a data model for sharing appears in FIG. 3 (middle table is sharing table, final table is the user/group "blowout" table which describes which users are contained in a group, or above a user in the role hierarchy (UG=User or Group)). According to one aspect, for a "lower level employee" user it is typically most advantageous to join these tables starting from the right, filtering on users Id to form a temporary result of the rows that can be seen. Because the user can not see many rows, this will yield a relatively selective path. An example query follows:

```
select a.name "ACCOUNT.NAME",
from sales.account a,
    (select distinct s.account_id
        from core.ug_blowout b, sales.acc_share s
            where s.organization_id = ?
            and b.organization_id = ?
            and b.users_id = ?
            and s.ug_id = b.ug_id
            and s.acc_access_level > 0) t,
    core.users u
where (t.account_id = a.account_id)
and (u.users_id = a.owner)
and (a.deleted = '0')
and (a.organization_id = ?)
and (u.organization_id = ?) )
```

Conversely for a "boss" user who can see most of the entity records in the organization, it is typically most advantageous to begin the query from the left and use a nested loop query plan onto the sharing table (acc_share), an example of which follows:

```
select
    a.name "ACCOUNT.NAME",
from
    sales.account a, core.users u
where (u.users_id = a.owner)
and (a.deleted = '0')
and (a.organization_id = ?)
and (exists (select 1
        from core.ug_blowout b,
            sales.acc_share s
        where s.organization_id = ?
        and b.organization_id = ?
        and b.users_id = ?
        and s.ug_id = b.ug_id
        and s.acc_access_level > 0
        and s.account_id = a.account_id) )
and (u.organization_id = ?)
```

Note that this query in general runs in relatively constant (reasonable) time for all users in an organization. It may not be particularly fast since it must look at all top-level entity records, but it is suitable for a boss who can in fact see most records. The first "lower level employee" query runs much faster for users who in fact can not see many records, but it may run much slower for bosses who can see all records. This, again, is why it is desirable to have an accurate decision between the two paths.

Filter Choice

A typical end user report execution includes a set of displayed columns from multiple tables along with a set of filter conditions. A typical report might join between 3 and 7 (or more) main tables with filtering possibly occurring on one or more of these tables. In addition, certain filters, such as the sharing filter discussed above (which can take the form of an additional join or a nested sub-query), should be applied to assure that the end user only sees data to which he has been given access.

Information about enumerated "picklist" fields (those fields that are known to contain a small list of possible values) are tracked in one aspect. Examples of these fields include the list of priority values for a task and the list of industries for an account. These fields are often used as filters for executive reporting and data rollup reports. In addition to the values themselves, the approximate number of times each value appears in the actual entity table for that organization (tenant) is tracked in the metadata. When a user provides a filter value such that the value appears infrequently for that organization, the overall query is preferably driven from that table and possibly from an index on that column, if such as index exists.

In one aspect, when a user runs a report with N filters, each filter is evaluated for expected selectiveness. If, for example, the user filters on "California" and "Florida" from a list of states and it is known that these values represent, respectively, 5 and 2 percent of the overall rows, then it is assumed that the filter has a 7% selectivity. Similarly if a boolean field has 95% true values, then filtering on false appears attractive as a filter, whereas filtering on Male from a random list of people would not be very selective, since 50% reduction would not make a good filter condition.

The selectivity of the sharing condition is also considered in one aspect. For a user with very low (perhaps 2%) visibility, the sharing filter might prove to be the best starting point and therefore the optimizer is instructed to begin with the filter, rather than one of the main entity tables such as, e.g., Account or Contact tables.

The cost-based optimizer, in one aspect, incorporates other filter types, in addition to semantics knowledge about the application. For example, if an organization has imported all opportunities for the last 3 years, and a user report filters on "all opportunities that closed in the last week" then this is likely to represent a selective filter. The presence of custom field indexes (e.g., a certain set of columns that administrators can choose to place into a B-tree indexed custom field columns into these heuristic decisions) are also factored in one aspect.

In one aspect, a query is only hinted if it is assumed that a particular starting table will yield a selective path. All other tables would then be joined via nested loops. Note, these types of cost-based decisions are similar to the decisions that the optimizer (e.g., Oracle optimizer) itself makes when deciding how to join tables. Importantly, the system of the present invention makes tenant-level data decisions based on tenant-level statistics and user-level data decisions based on user-level statistics. The system of the present invention also takes into account application-level concepts such as sharing that are beyond the generic nature of the underlying RBDMS.

For picklist fields, the statistics tracked and stored do not need to reflect the exact number of occurrences for each value, a reasonable estimate is sufficient in one aspect. Values missing from the statistics either do not occur at all, or occur infrequently—it is assumed that they make good filters.

In one embodiment, each update or insert into an entity table passes through an application server 100. Therefore as the data is being processed in Java counters are incremented and decremented for individual picklist values. Inserts increment a counter, while updates to a different value decrement a counter for the old value and increment a counter for the new value. Since these statistics do not need to be exact, the statistics metadata is preferably not updated with each and every database insert or update (which might affect performance). Rather, in one aspect, an in-memory cache server (which already contains the metadata for valid picklist values) is augmented with the counters for these values, with the ability to update the database values periodically to persist the changes. An example of such a cache server can be found in U.S. patent application Ser. No. 10/418,961, filed Apr. 17, 2003, titled "Java Object Cache Server for Databases", the contents of which are hereby incorporated by reference in its entirety.

For row deletion, the data preferably does not pass through the application server 100. However, all main entities are preferably soft-deleted (with a modification stamp), meaning the rows are left in the database for possible un-deletion. Therefore, an asynchronous process is preferably used to update the statistics when rows are deleted and un-deleted since it is known which rows have been touched since the last running of that process.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for managing information on a multi-tenant database system, the method comprising:
   storing the information on the database among a plurality of tables, the plurality of tables being arranged in columns and rows;
   for each of a subset of the plurality of tables, distributing sets of the rows amongst different tenant storage areas in the database according to either a physical arrangement or a logical arrangement, with a first of the sets being located at a first tenant storage area and a second of the sets being located at a second tenant storage area; and
   keeping tenant-level statistics on a per-tenant basis in the first and second tenant storage areas; and
   providing data storage and retrieval capabilities to the multi-tenant database system in response to requests from one of a plurality of remotely disposed computer systems, wherein the data storage and retrieval capabilities include at least:
   a) consulting the tenant-level statistics, and
   b) programmatically generating syntax of a query based on the tenant-level statistics.

2. The method as recited in claim 1 wherein a statistics generation engine processes multi-tenant tables produces tenant-level and user-level statistics tables.

3. The method as recited in claim 2:
   wherein providing the data storage and retrieval capabilities comprises an optimization engine retrieving and processing the appropriate tenant-level and user-level statistics tables; and
   wherein programmatically generating syntax of a query based on the tenant-level statistics comprises the optimization engine optimizing SQL queries based on the appropriate tenant-level and user-level statistics tables.

4. The method as recited in claim 1 wherein distributing further includes establishing the rows located at the first tenant storage area to include user-level metadata, and establishing the rows located at the second tenant storage area to include tenant-level metadata.

5. The method as recited in claim 1 wherein providing the data storage and retrieval capabilities comprises a query optimizer to minimize an amount of data that must be read from disk by choosing tables or columns that are most selective, wherein the tables or columns that are most selective yield the fewest rows when the query condition is evaluated.

6. The method as recited in claim 1 wherein flags or tags are implemented in the plurality of tables of the multi-tenant database system to distinguish users and tenants.

7. The method as recited in claim 1 further including restricting a subgroup of the plurality of second computer systems to access information corresponding to the rows located at the first tenant storage area, while preventing access to information corresponding to the rows located at the second tenant storage area.

8. A non-transitory machine-readable medium having instructions stored thereon that, when executed by one or more processors of a multi-tenant database system, cause the multi-tenant database system to perform operations comprising:
storing the information on the database among a plurality of tables, the plurality of tables being arranged in columns and rows;
for each of a subset of the plurality of tables, distributing sets of the rows amongst different tenant storage areas in the database according to either a physical arrangement or a logical arrangement, with a first of the sets being located at a first tenant storage area and a second of the sets being located at a second tenant storage area; and
keeping tenant-level statistics on a per-tenant basis in the first and second tenant storage areas; and
providing data storage and retrieval capabilities to the multi-tenant database system in response to requests from one of a plurality of remotely disposed computer systems, wherein the data storage and retrieval capabilities include at least:
a) consulting the tenant-level statistics, and
b) programmatically generating syntax of a query based on the tenant-level statistics.

9. The machine readable medium of claim 8 wherein a statistics generation engine processes multi-tenant tables produces tenant-level and user-level statistics tables.

10. The machine readable medium of claim 9:
wherein providing the data storage and retrieval capabilities comprises an optimization engine retrieving and processing the appropriate tenant-level and user-level statistics tables; and
wherein programmatically generating syntax of a query based on the tenant-level statistics comprises the optimization engine optimizing SQL queries based on the appropriate tenant-level and user-level statistics tables.

11. The machine readable medium of claim 8 wherein the instructions to carry out the step of distributing further includes instructions to carry out a step of establishing the rows located at the first tenant storage area to include user-level metadata, and establishing the rows located at the second tenant storage area to include tenant-level metadata.

12. The machine readable medium of claim 8 wherein providing the data storage and retrieval capabilities comprises a query optimizer to minimize an amount of data that must be read from disk by choosing tables or columns that are most selective, wherein the tables or columns that are most selective yield the fewest rows when the query condition is evaluated.

13. The machine readable medium of claim 8 wherein flags or tags are implemented in the plurality of tables of the multi-tenant database system to distinguish users and tenants.

14. The machine readable medium of claim 8 further including a step of restricting a subgroup of the plurality of second computer systems to access information corresponding to the rows located at the first tenant storage area, while preventing access to information corresponding to the rows located at the second tenant storage area.

15. A data center for managing information on a multi-tenant database, the data center comprising:
a processor; and
a memory space having a sequence of instructions which, when executed by the processor, causes the processor to carry out the steps of:
storing the information on the database among a plurality of tables, the plurality of tables being arranged in columns and rows;
for each of a subset of the plurality of tables, distributing sets of the rows amongst different tenant storage areas in the database according to either a physical arrangement or a logical arrangement, with a first of the sets being located at a first tenant storage area and a second of the sets being located at a second tenant storage area; and
keeping tenant-level statistics on a per-tenant basis in the first and second tenant storage areas; and
providing data storage and retrieval capabilities to the multi-tenant database system in response to requests from one of a plurality of remotely disposed computer systems, wherein the data storage and retrieval capabilities include at least:
a) consulting the tenant-level statistics, and
b) programmatically generating syntax of a query based on the tenant-level statistics.

16. The data center as recited in claim 15 wherein a statistics generation engine processes multi-tenant tables produces tenant-level and user-level statistics tables.

17. The data center as recited in claim 16:
wherein providing the data storage and retrieval capabilities comprises an optimization engine retrieving and processing the appropriate tenant-level and user-level statistics tables; and
wherein programmatically generating syntax of a query based on the tenant-level statistics comprises the optimization engine optimizing SQL queries based on the appropriate tenant-level and user-level statistics tables.

18. The data center as recited in claim 15 wherein said sequence of instructions to carry of the step of distributing further includes a sub-routine to carry out a step of establishing the rows located at the first tenant storage area to include user-level metadata, and establishing the rows located at the second tenant storage area to include tenant-level metadata.

19. The data center as recited in claim 15 wherein providing the data storage and retrieval capabilities comprises a query optimizer to minimize an amount of data that must be read from disk by choosing tables or columns that are most selective, wherein the tables or columns that are most selective yield the fewest rows when the query condition is evaluated.

20. The data center as recited in claim 15 wherein flags or tags are implemented in the plurality of tables of the multi-tenant database system to distinguish users and tenants.

* * * * *